(12) United States Patent
Murakami et al.

(10) Patent No.: US 8,684,366 B2
(45) Date of Patent: Apr. 1, 2014

(54) VEHICLE HEIGHT ADJUSTMENT DEVICE IN VEHICLE

(71) Applicant: Showa Corporation, Saitama (JP)

(72) Inventors: Yosuke Murakami, Shizuoka (JP);
Narimasa Hosoya, Tochigi (JP);
Kosuke Sano, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 13/776,004

(22) Filed: Feb. 25, 2013

(65) Prior Publication Data

US 2014/0001716 A1 Jan. 2, 2014

(30) Foreign Application Priority Data

Jun. 29, 2012 (JP) ................................. 2012-147502

(51) Int. Cl.
*B60G 17/044* (2006.01)
(52) U.S. Cl.
USPC .................................... 280/5.514; 280/6.157
(58) Field of Classification Search
USPC ............ 280/6.157, 5.514, 6.15, 6.159, 6.154, 280/6.155, 6.151, 6.152
See application file for complete search history.

(56) References Cited

U.S. PATENT DOCUMENTS

| | | | | |
|---|---|---|---|---|
| 4,647,069 A | * | 3/1987 | Iijima | 280/5.514 |
| 5,135,065 A | * | 8/1992 | Kawasaki et al. | 180/41 |
| 5,201,384 A | * | 4/1993 | Kiyota et al. | 180/219 |
| 7,607,672 B2 | * | 10/2009 | Suzuki et al. | 280/124.16 |
| 7,761,205 B2 | * | 7/2010 | Onuma et al. | 701/36 |
| 2011/0227301 A1 | * | 9/2011 | Nagai et al. | 280/6.157 |

FOREIGN PATENT DOCUMENTS

JP 1996022680 B 3/1996

* cited by examiner

*Primary Examiner* — Drew Brown
(74) *Attorney, Agent, or Firm* — Keith H. Orum; Orum & Roth, LLC

(57) ABSTRACT

A vehicle height adjustment device affords better footing by ensuring that a vehicle height is lowered upon vehicle stop. A vehicle height adjustment device 100 in a vehicle has means (ECU) for predicting a vehicle stopping predicted time, and when a predicted vehicle stopping predicted time is not more than a predefined reference vehicle stopping time, implementing a vehicle height lowering control mode, and enabling a vehicle height lowering operation through switching of a switching valve.

20 Claims, 5 Drawing Sheets

VEHICLE HEIGHT ADJUSTMENT DEVICE IN VEHICLE

BACKGROUND OF THE INVENTION

1. Field of the Invention

The present invention relates to a vehicle height adjustment device suitably used in a motorcycle and the like.

2. Description of the Related Art

A vehicle height of motorcycles is preferably low upon stop of the motorcycle, so as to enable a short rider to easily stand with his/her feet on the ground, without tumbling. On the other hand, a certain degree of vehicle height is needed in terms of bank angle, shock absorption and the like during travel. In some American-model motorcycles and the like, moreover, a low vehicle height upon stop is also required from the viewpoint of exterior design.

Accordingly, conventional vehicle height adjustment devices for vehicles have been proposed, such as the one in Japanese Examined Patent Publication No. H8-22680. That vehicle height adjustment device has a damper tube provided in either a vehicle body side or an axle side; a piston rod, provided in the other from among the vehicle body side and the axle side, and that extends and retracts with respect to the damper tube by sliding in an oil chamber within the damper tube; a hydraulic jack that is provided in either the damper tube or the piston rod; a spring receiver that is supported on a plunger that is inserted in a jack chamber of the hydraulic jack; a suspension spring that is interposed between the spring receiver and a spring receiver that is provided in the other from among the damper tube and the piston rod; a hydraulic pump that supplies a working oil to the jack chamber of the hydraulic jack through a pumping operation resulting from extension and retraction of the piston rod with respect to the damper tube; and a switching valve that closes so as to stop the working oil that is supplied to the jack chamber of the hydraulic jack, or that opens so as to discharge the working oil; such that the vehicle height can be adjusted through extension and retraction of the piston rod with respect to the damper tube.

In the vehicle height adjustment device of vehicles disclosed in Japanese Examined Patent Publication No. H8-22680, vehicle height is lowered automatically at or below a set vehicle speed and is automatically raised when the set vehicle speed is exceeded.

Patent document: Japanese Examined Patent Publication No. H8-22680

SUMMARY OF THE INVENTION

In the vehicle height adjustment device disclosed in Japanese Examined Patent Publication No. H8-22680, the vehicle height may fail, in cases of rapid deceleration, to be thoroughly lowered, even a vehicle height lowering operation is brought about, when the vehicle speed becomes no faster than the set vehicle speed, within a short lapse of time until the vehicle stops.

Once the vehicle speed is not faster than the set vehicle speed and, accordingly, a vehicle height lowering operation is brought about, the vehicle height lowering operation cannot then be discontinued even if the vehicle speed is increased thereafter. It is thus not possible to shift to a vehicle height raising operation until the vehicle height lowering operation is over.

It is an object of the present invention to provide a vehicle height adjustment device that affords better footing by ensuring that vehicle height is lowered upon vehicle stop.

It is a further object of the present invention to enable shifting to a vehicle height raising operation, as the case may require, even when a vehicle height lowering operation is in progress.

The invention of claim 1 is a vehicle height adjustment device in a vehicle, including: a damper tube provided on either one of a vehicle body side or an axle side; a piston rod that is provided on the other of either the vehicle body side or the axle side and that extends and retracts with respect to the damper tube by sliding in an oil chamber within the damper tube; a hydraulic jack that is provided on one side of either the damper tube or the piston rod; a spring receiver that is supported on a plunger that is inserted in a jack chamber of the hydraulic jack; a suspension spring that is interposed between said spring receiver and a spring receiver that is provided on the other side of either the damper tube or the piston rod; a hydraulic pump that supplies a working oil to the jack chamber of the hydraulic jack through a pumping operation resulting from extension and retraction of the piston rod with respect to the damper tube; and a switching valve for intake and discharge of the working oil, so as to implement switching for the working oil to the jack chamber of the hydraulic jack, such that a vehicle height is adjusted due to extension and retraction of the piston rod with respect to the damper tube, wherein the vehicle height adjustment device has means for predicting a vehicle stopping predicted time, and when the predicted vehicle stopping predicted time is not more than a predefined reference vehicle stopping time, implementing a vehicle height lowering control mode, and enabling a vehicle height lowering operation through switching of the switching valve.

A specific operation may involve, in case of rapid deceleration, initiating the vehicle height lowering operation from an earlier timing (high speed) and securing a vehicle height lowering operation time until vehicle stop, and in case of slow deceleration, preparing for a travel pattern that does not result in vehicle stop, without implementing a vehicle height lowering operation, up to a later timing (low speed).

The invention of claim 2 is the invention of claim 1, further including: means for, when the predicted vehicle stopping predicted time exceeds a predefined secondary reference vehicle stopping time in said vehicle height lowering control mode, implementing a vehicle height raising control mode, and enabling a vehicle height raising operation through operation of the switching valve.

The invention of claim 3 is the invention of claim 1 or 2, wherein the vehicle stopping predicted time is predicted on the basis of deceleration of the vehicle.

The invention of claim 4 is the invention of any of claims 1 to 3, wherein a reference vehicle speed is established at which prediction of the vehicle stopping predicted time is to begin, and the vehicle stopping predicted time is predicted when the vehicle speed becomes no faster than the reference vehicle speed.

The invention of claim 5 is the invention of any of claims 1 to 4, further comprising: means for establishing a vehicle height lowering vehicle speed at which the vehicle height is to be lowered, irrespective of the vehicle stopping predicted time, and when the vehicle speed becomes no faster than the vehicle height lowering vehicle speed, implementing the vehicle height lowering control mode and enabling the vehicle height lowering operation through switching of the switching valve; and when the vehicle speed exceeds the vehicle height lowering vehicle speed in said vehicle height lowering control mode, implementing the vehicle height raising control mode and enabling the vehicle height raising operation through switching of the switching valve.

The invention of claim 6 is the invention of any of claims 1 to 5, further comprising: means for, upon detection that a side stand of the vehicle has changed from a standby position to a working position, implementing the vehicle height lowering control mode and enabling the vehicle height lowering operation through switching of the switching valve.

The invention of claim 7 is the invention of any of claims 1 to 6, wherein the switching valve comprises a solenoid valve, and the vehicle height adjustment device further has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state.

(Claim 1)

(a) A vehicle stopping predicted time is predicted, and when the predicted vehicle stopping predicted time is not more than a predefined reference vehicle stopping time, a vehicle height lowering control mode is brought about, and a vehicle height lowering operation is enabled through switching of the switching valve. The vehicle height is lowered from that during travel when the vehicle is close to coming to a stop; the vehicle height can be thoroughly lowered within a short time until stop of the vehicle; and footing can thus be improved and stability secured.

(Claim 2)

(b) When the predicted vehicle stopping predicted time exceeds a predefined secondary reference vehicle stopping time, while in the vehicle height lowering control mode described in (a), a vehicle height raising control mode is brought about and the vehicle height raising operation is enabled through switching of the switching valve. The vehicle height lowering operation can be discontinued, and can shift smoothly to a vehicle height raising operation, without thorough lowering of the vehicle height, when, during deceleration so as to bring the vehicle to a stop, on account of a traffic signal or the like, the signal changes and the vehicle re-accelerates.

(Claim 3)

(c) The vehicle stopping predicted time is predicted on the basis of deceleration of the vehicle.

(Claim 4)

(d) There is established a reference vehicle speed at which prediction of the vehicle stopping predicted time is to begin, and the vehicle stopping predicted time is predicted when the vehicle speed of the vehicle becomes no faster than the reference vehicle speed. Prediction of the vehicle stopping predicted time is not necessary, and is not performed, when the vehicle speed is faster than a reference vehicle speed for which immediate stopping of the vehicle is unlikely. The vehicle stopping predicted time is predicted, and the vehicle height lowering operation is performed, after the vehicle speed becomes no faster than the reference vehicle speed at which the vehicle can stop safely.

(Claim 5)

(e) There is established a vehicle height lowering vehicle speed for which the vehicle height is to be lowered, irrespective of the vehicle stopping predicted time, such that when the vehicle speed of the vehicle becomes no faster than the vehicle height lowering vehicle speed, the vehicle height lowering control mode is brought about and the vehicle height lowering operation is enabled through switching of the switching valve; and when the vehicle speed of the vehicle exceeds the vehicle height lowering vehicle speed while in the vehicle height lowering control mode, the vehicle height raising control mode is brought about and the vehicle height raising operation is enabled through switching of the switching valve. When the vehicle speed is a speed lower than the vehicle height lowering vehicle speed for which the vehicle can stop at any time, the vehicle height is lowered in preparation for that stopping.

(Claim 6)

(f) Upon detection that a side stand of the vehicle has changed from a standby position to a working position, the vehicle height lowering control mode is brought about and the vehicle height lowering operation is enabled through switching of the switching valve. When the side stand is changed to a working position, the vehicle is necessarily in a stopped state, and the vehicle height is lowered.

(Claim 7)

(g) The switching valve comprises a solenoid valve, and the vehicle height adjustment device has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state. At the energized state holding stage of the switching valve that comprises the solenoid valve, battery consumption is reduced through lowering of the voltage applied to the solenoid valve. This constitutes an energy-saving mode.

DESCRIPTION OF THE PREFERRED EMBODIMENTS

Figure 1:
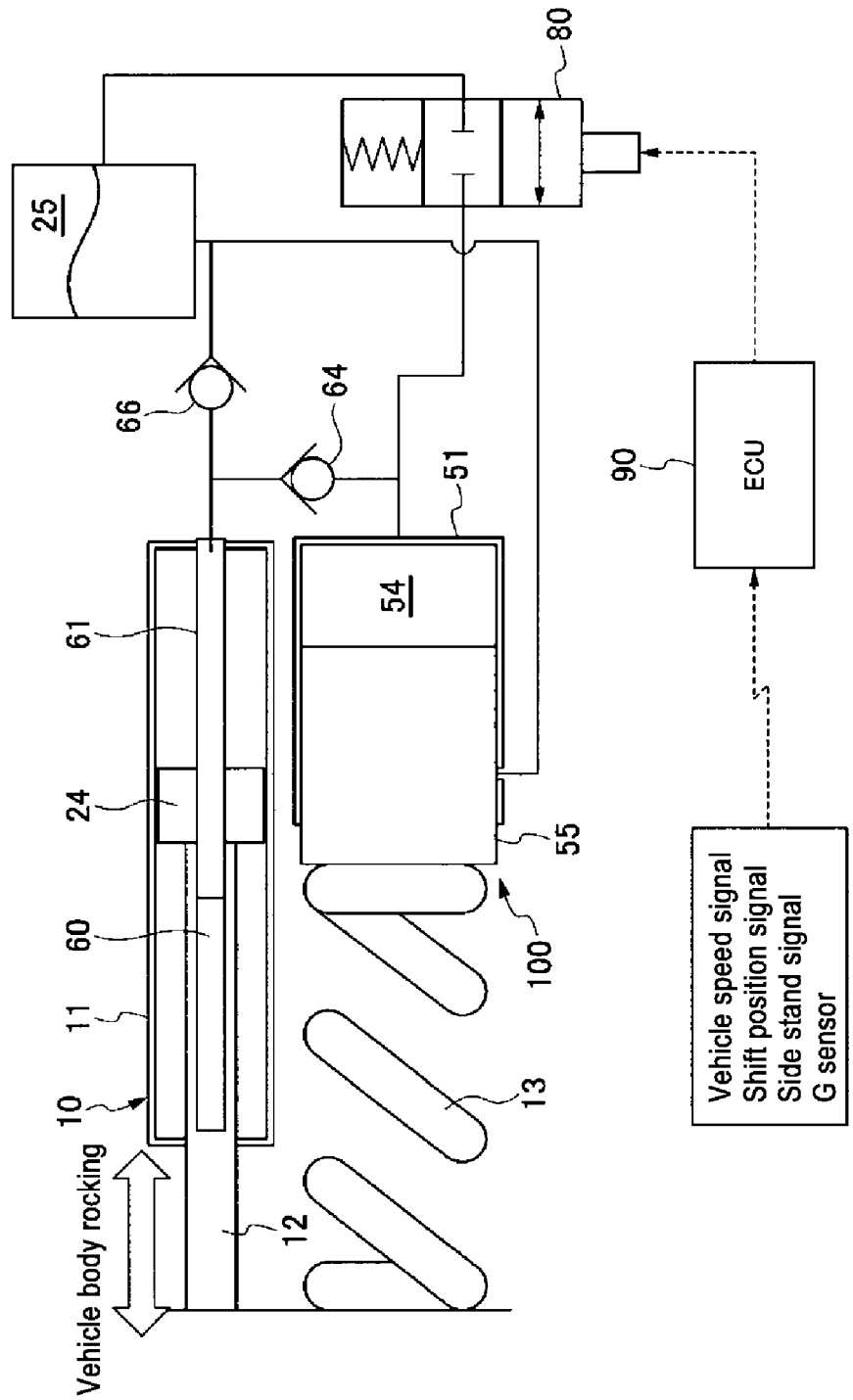
FIG. 1 is a schematic diagram illustrating an embodiment of a vehicle height adjustment device.

FIG. 1 is a schematic diagram illustrating a vehicle height adjustment device 100 that is provided in a hydraulic shock absorber 10 of a motorcycle.

Figure 2:
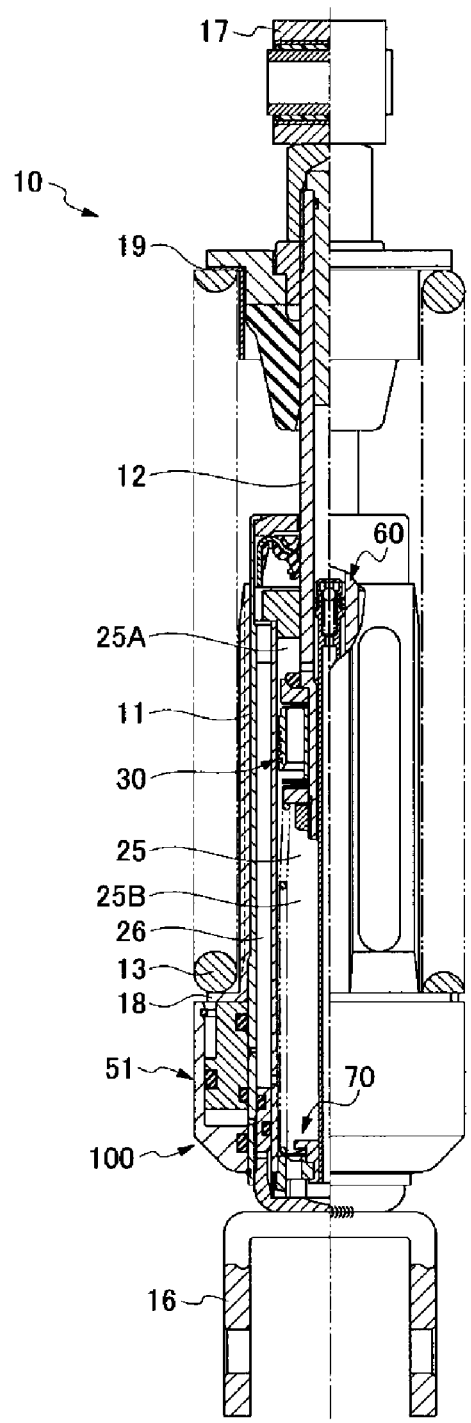
FIG. 2 is a cross-sectional view illustrating a hydraulic shock absorber.
Figure 3:
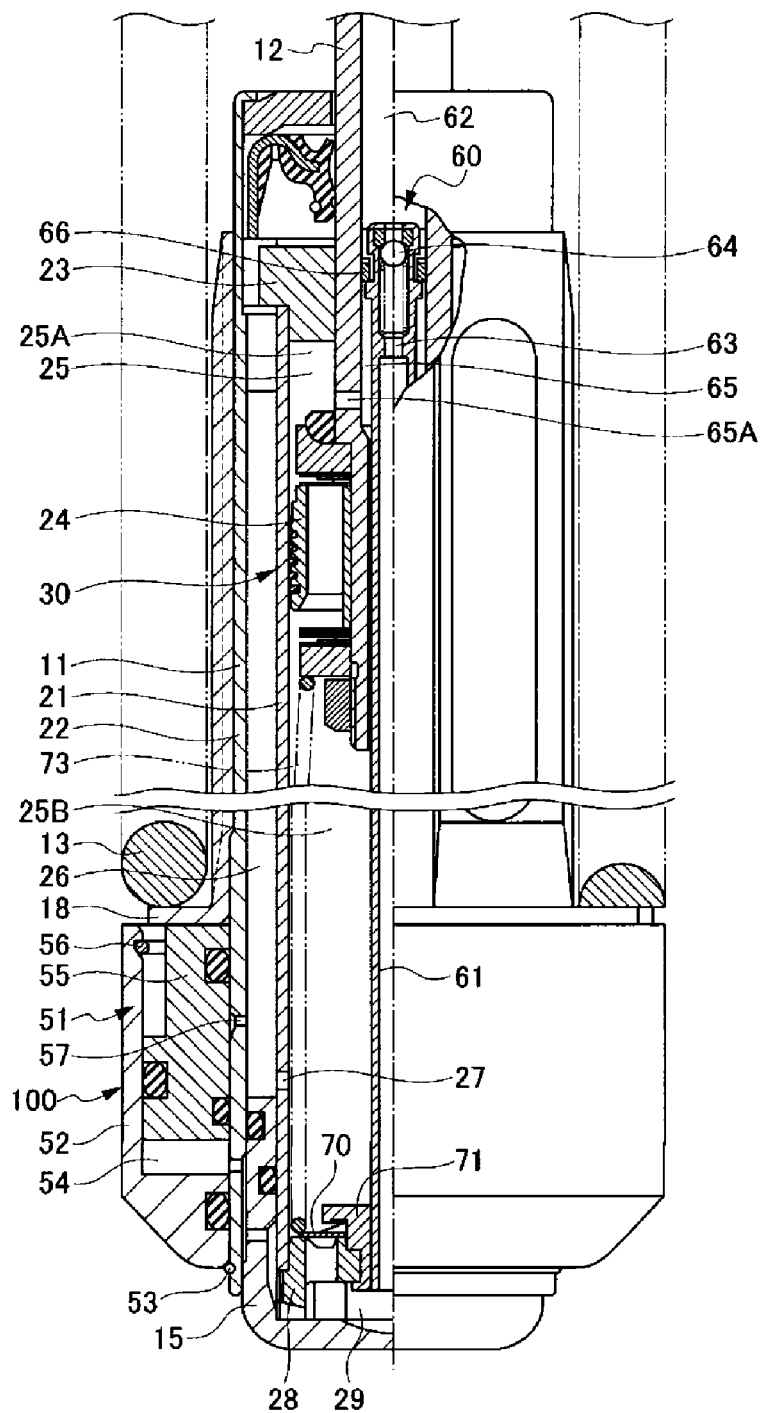
FIG. 3 is an enlarged cross-sectional view of a relevant portion of FIG. 2.
Figure 4:
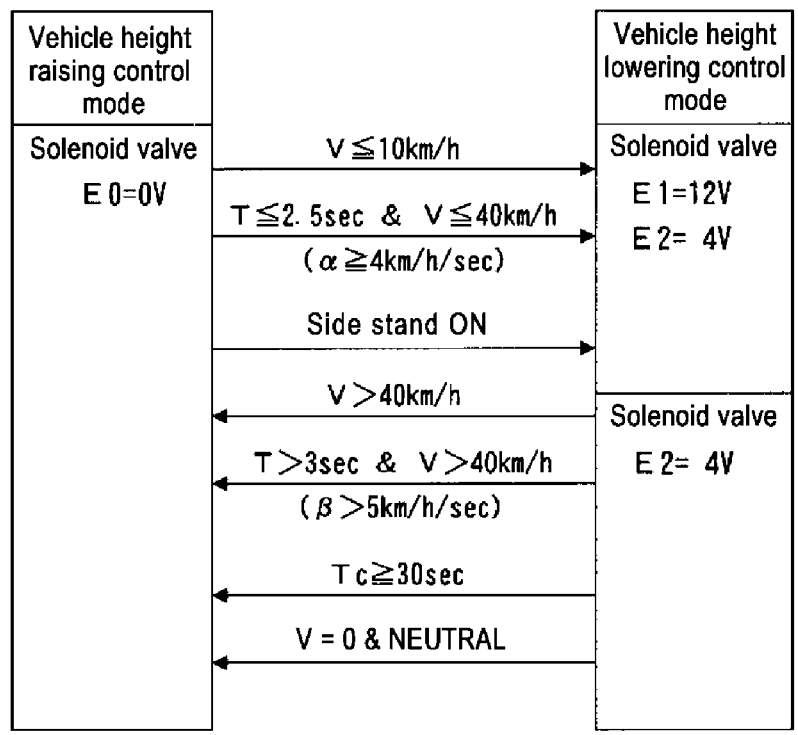
FIG. 4 is a control state diagram of a vehicle height adjustment device.

As illustrated in, for instance, FIG. 2 and FIG. 3, the hydraulic shock absorber 10, which makes up a rear wheel suspension device, is interposed between the rear axle side and the vehicle body side of a motorcycle. The hydraulic shock absorber 10 has a damper tube 11 mounted on the axle side; a piston rod 12, mounted on the vehicle body side, and extending and retracting with respect to the damper tube 11, within the damper tube 11, via a piston 24; and a suspension spring 13 that is disposed around an outer periphery of the damper tube 11 and the piston rod 12.

An axle-side mounting member 16 is fixed to a bottom cup 15 at a bottom of the damper tube 11. A vehicle body-side mounting member 17 is fixed to an upper end of the piston rod 12.

At a lower end-side outer peripheral section of the damper tube 11 there is provided a spring receiver 18 that is supported on a plunger 55 that is inserted in a jack chamber 54 of a hydraulic jack 51 of the vehicle height adjustment device 100 described later in detail. A spring receiver 19 supported on the vehicle body-side mounting member 17 is provided on the piston rod 12, such that an upper end of the suspension spring 13 is supported on the spring receiver 19, and a lower end of the suspension spring 13 is supported on the spring receiver 18.

The damper tube 11 of the hydraulic shock absorber 10 is configured in the form of a double tube comprising an inner tube 21 and an outer tube 22. The piston rod 12 runs through, and is supported on, a rod guide 23 that is fixed to the open ends of the outer tube 22 and the inner tube 21. The piston 24 is fixed to an end insertion into the inner tube 21, of the piston rod 12. In the hydraulic shock absorber 10, a piston rod-side oil chamber 25A and a piston-side oil chamber 25B are formed through partitioning of the interior of the inner tube 21 by the piston 24. An annular gap between the inner tube 21 and the outer tube 22 constitutes an oil reservoir chamber 26, such that a working oil is sealed in the oil chambers 25A, 25B and the oil reservoir chamber 26. The oil reservoir chamber 26 holds the working oil, while a top section of the oil reservoir chamber 26 constitutes an air chamber. The oil reservoir chamber 26 communicates at all times with the piston-side oil chamber 25B via a communicating hole 27 that is provided on the lower end side (axle side) of the inner tube 21. The oil reservoir chamber 26 compensates for the working oil in proportion to the volume of the piston rod 12 that enters into, and withdraws from, the inner tube 21, accompanying extension and compression of the hydraulic shock absorber 10.

The hydraulic shock absorber 10 has a piston valve device 30 provided in the piston 24, such that the piston rod-side oil chamber 25A and the piston-side oil chamber 25B can communicate with each other by way of the piston valve device 30. The piston valve device 30 constitutes a damping force generation device. By virtue of the piston valve device 30 that constitutes the damping force generation device, the hydraulic shock absorber 10 dampens stretching vibration of the piston rod 12 and the damper tube 11 that accompanies absorption, by the suspension spring 13, of impact force from the road surface.

The vehicle height adjustment device 100 is provided with the hydraulic jack 51 on the outer periphery of the outer tube 22 in the damper tube 11. In the hydraulic jack 51, a jack housing 52 is fitted through insertion, in a liquid-tight manner by way of an O-ring, on the outer periphery of the outer tube 22. A lower end of the jack housing 52 is supported by a stopper ring 53 that is engaged on the outer periphery of the outer tube 22. The plunger 55 is inserted into the annular jack chamber 54 that is defined between the jack housing 52 and the outer periphery of the outer tube 22. The plunger 55 is fitted through insertion, in a liquid-tight manner by way of O-rings, on an inner periphery of the jack housing 52 and the outer periphery of the outer tube 22 respectively. The spring receiver 18 for the abovementioned suspension spring 13 is supported on a top face of the plunger 55. The plunger 55 can project out of the jack chamber 54, through the action of the working oil that is supplied to the jack chamber 54. The projection end is restricted by a stopper ring 56 that is engaged to an open end-side inner periphery of the jack housing 52.

In the hydraulic jack 51, the outer tube 22 has a hole-like oil return passage 57 through which the working oil in the jack chamber 54 returns to the oil reservoir chamber 26 in the outer tube 22 of the damper tube 11 when the plunger 55 reaches the abovementioned projection end up to which the plunger 55 projects out of the jack chamber 54.

The vehicle height adjustment device 100 has a hydraulic pump 60 that supplies and discharges the working oil to/from the jack chamber 54 of the hydraulic jack 51, as a result of a pumping operation arising from extension and retraction of the piston rod 12 with respect to the damper tube 11, and a blowdown valve 70 that relieves jack pressure in the jack chamber 54 that is pressurized by the plunger 55, of the hydraulic jack 51, that receives a spring load of the suspension spring 13. The blowdown valve 70 is urged in a closing direction by an urging means 73, comprising a coil spring, that is interposed between the blowdown valve 70 and the piston 24. A valve-opening pressure of the blowdown valve 70 is determined by the urging means 73.

The hydraulic pump 60 is configured in such a manner that a hollow pipe 61, which is standingly provided through fitting with a central hole of a valve stopper 71 for the blowdown valve 70 and that is fixed to the center of an end piece 28 of the damper tube 11, is slidably inserted into a pump chamber 62 that is formed by a hollow section of the piston rod 12. A below-described discharge passage 63 of the hydraulic pump 60 communicates with the jack chamber 54 of the hydraulic jack 51 by way of a communication passage 29 that is formed between the end piece 28 and the abovementioned bottom cup 15.

The hydraulic pump 60 is provided with a discharge check valve 64 in the discharge passage 63 through which there is discharged, towards the hydraulic jack 51, the working oil in the pump chamber 62 that is pressurized by virtue of the retracting action that arises as the piston rod 12 enters the damper tube 11 and the hollow pipe 61, and is provided with an intake check valve 66 in the intake passage 65 through which the working oil in the inner tube 21 of the damper tube 11 is taken into the pump chamber 62 that is brought to negative pressure by virtue of the extending action that arises as the piston rod 12 withdraws from the damper tube 11 and the hollow pipe 61. The discharge passage 63 is configured by a hollow section of the hollow pipe 61. The intake passage 65 is formed by an intake hole 65A that runs through an interior and exterior of the piston rod 12 and that opens into the piston rod-side oil chamber 25A, and by an annular gap between an inner periphery of the piston rod 12 and an outer periphery of the hollow pipe 61.

Accordingly, the hydraulic pump 60 performs a pumping operation through vibration of the hydraulic shock absorber 10 on account of irregularities on the road surface, as the vehicle travels, and through the extension and retraction that arises from reciprocation of the piston rod 12 in the damper tube 11 and the hollow pipe 61. When the pump chamber 62 is pressurized through the pumping operation arising from the retracting action of the piston rod 12, an oil in the pump chamber 62 opens the discharge check valve 64 and is discharged thereby towards the hydraulic jack 51 via the discharge passage 63 in the hollow section of the hollow pipe 61. When the pump chamber 62 is brought to negative pressure through the pumping operation arising from the extending action of the piston rod 12, an oil in the piston rod-side oil chamber 25A of the damper tube 11 opens the intake check valve 66, and is taken thereby into the pump chamber 62 via the intake passage 65 at the outer periphery of the hollow pipe 61.

The vehicle height adjustment device 100 has a switching valve 80 that closes so as to stop working oil that supplied to the jack chamber 54 of the hydraulic jack 51, or that opens so as to discharge the working oil to the working oil chamber 25 (piston rod-side oil chamber 25A and piston-side oil chamber 25B) (optionally the oil reservoir chamber 26) of the damper tube 11. Through opening and closing control of the switching valve 80, the vehicle height adjustment device 100 adjusts a liquid level of the working oil that is supplied to the jack chamber 54 of the hydraulic jack 51 by the hydraulic pump 60 that performs a pumping operation arising from extension and retraction of the piston rod 12 with respect to the damper tube 11, and accordingly, through adjustment of the projection height of the plunger 55 that projects out of the jack chamber 54, controls a vehicle height in the manner described below.

In the present embodiment, the switching valve 80 is configured in the form of a solenoid valve, such an ECU (control means) 90 controls the switching on and off of the switching valve 80. The switching valve 80 in the present embodiment is a two-port two-position solenoid valve, and is interposed between the working oil chamber 25 of the damper tube 11 (optionally the oil reservoir chamber 26), and the jack chamber 54 of the hydraulic jack 51.

The ECU 90 of the present embodiment performs on/off control of the switching valve 80 by obtaining a vehicle speed signal of the vehicle, a shift position signal, a G sensor (acceleration sensor) signal, a side stand signal and the like. The switching valve 80 is, for instance, a normally closed valve.

In a vehicle height lowering control mode in which the ECU 90 outputs an on-signal, the switching valve 80 opens, and the jack chamber 54 of the hydraulic jack 51 is connected thereby to the working oil chamber 25 of the damper tube 11. As a result, the hydraulic pump 60 discharges the working oil that is supplied to the jack chamber 54 of the hydraulic jack 51 to the working oil chamber 25; thereby, the liquid level in the jack chamber 54 of the hydraulic jack 51, and accordingly the projection height of the plunger 55, are lowered, and the vehicle height lowering operation is enabled.

By contrast, in a vehicle height raising control mode in which the ECU 90 outputs an off-signal, the switching valve 80 closes; thereby, the jack chamber 54 of the hydraulic jack 51 is shut off from the working oil chamber 25 of the damper tube 11, and the vehicle height is maintained or a vehicle height raising operation is enabled, without discharge, by the hydraulic pump 60, of the working oil that is supplied to the jack chamber 54 of the hydraulic jack 51. Through the pumping operation arising from the above-described extension action of the piston rod 12, the hydraulic pump 60 can then cause oil in the piston rod-side oil chamber 25A of the damper tube 11 to be sucked into the pump chamber 62, via the intake check valve 66. Through the pumping operation arising from the above-described retracting action of the piston rod 12, the hydraulic pump 60 supplies oil of the pump chamber 62 to the jack chamber 54 of the hydraulic jack 51, via the discharge check valve 64, and the vehicle height raising operation is enabled.

The switching valve 80 may be a normally-open valve.

A control mode by the vehicle height adjustment device 100 is performed specifically as described below.

(A) Vehicle Height Lowering Control Mode

While in a vehicle height raising control mode, in which the vehicle height raising operation is enabled through closing of the switching valve 80 when the vehicle is traveling or is stopped for a prolonged time, the ECU 90 shifts to a vehicle height lowering control mode of opening the switching valve 80, depending on any one of control conditions 1 to 3 below.

When the ECU 90 enters the vehicle height lowering control mode and opens the switching valve 80 from a closed-valve state, the ECU 90 lowers the voltage that is applied to the switching valve 80 down to a solenoid open-valve holding voltage E2, of an open-valve holding stage after a predefined time has elapsed since valve opening, that is lower than the initial applied voltage (solenoid open-valve initial voltage E1) at which the switching valve 80 is opened from a closed-valve state. Energy in the form of the solenoid current that is supplied to the switching valve 80 is saved thereby, herein, for instance, E1=12V and E2=4V.

A normal voltage (voltage at start-up) is applied over a certain period of time when the solenoid is in an open-valve holding state; as a result, it becomes possible to prevent a malfunction caused by vibration or the like, and to enable recovery from a malfunction state.

1. Vehicle Speed Control

When a vehicle speed V of the vehicle is not faster than a vehicle height lowering vehicle speed Vd (V≤d), the ECU 90 enters the vehicle height lowering control mode, and enables the vehicle height lowering operation through opening of the switching valve 80.

The vehicle height lowering vehicle speed Vd is established beforehand by the ECU 90. For instance, Vd is 10 km/h.

2. Vehicle Stopping Predicted Time Control

The ECU 90 predicts a vehicle stopping predicted time T, and when the predicted vehicle stopping predicted time T is not more than a predefined reference vehicle stopping time Ta (T≤a), the ECU 90 enters the vehicle height lowering control mode, and enables the vehicle height lowering operation through opening of the switching valve 80.

The ECU 90 calculates deceleration on the basis of the vehicle speed of the vehicle, or detects deceleration by way of a G sensor, and predicts the vehicle stopping predicted time T on the basis of deceleration.

The ECU 90 sets the reference vehicle stopping time Ta to a discharge time of the working oil with which the jack chamber 54 of the hydraulic jack 51 is filled (a time of discharge from the jack chamber 54 to the working oil chamber 25 (optionally the oil reservoir chamber 26) of the damper tube 11 via the switching valve 80).

Herein, the ECU 90 establishes beforehand a reference vehicle speed Va at which prediction of the vehicle stopping predicted time T is to begin, and predicts the vehicle stopping predicted time T when the vehicle speed V of the vehicle is not faster than the reference vehicle speed Va (V≤Va).

In vehicle stopping predicted time control, the ECU 90 may enter into the vehicle height lowering control mode and may enable vehicle height lowering operation through opening of the switching valve 80, when a deceleration α of the vehicle is equal to or greater than a predefined reference deceleration αa (α≥αa), instead of the above-described control conditions T≤Ta and V≤Va.

The reference vehicle speed Va, the reference vehicle stopping time Ta and the reference deceleration αa are established beforehand by the ECU 90. For instance, Va is set to 40 km/h, Ta is set to 2.5 sec and αa is set to 4 km/h/sec.

The vehicle stopping predicted time is a parameter, having dimensions of time, that represents the time that it takes for a traveling vehicle to come to a stop in the immediate future, and is predicted and calculated on the basis of vehicle motion parameters at every moment.

An actual comparison operation may involve, for instance, an operation in which the time dimension is split into both terms of a comparison expression, and a comparison is performed for each term, in the form of a comparison operation from which, superficially, the "time" order is absent.

For instance, one of the simplest equations for vehicle stopping time prediction is $T=-V/\alpha=-V \cdot dt/dV$ (equation assuming uniformly accelerated motion). The three comparison expressions below, though, have the same meaning, and are all in effect comparison expressions according to which there is performed the comparison operation of the vehicle stopping predicted time, even if, for the sake of convenience in the calculations, the comparison methods are different.

$T<c$ (c is a threshold value, herein c=Ta)

$$V \leftarrow c \cdot \alpha$$

$$-\alpha > c \cdot V$$

A further example of comparison for each term may involve, for instance, a logical product of the comparisons of each term V and α on the basis of which stopping time is calculated so that $(V<c1)\cap(-\alpha>c2)$ (where c1 and c2 are threshold values).

Herein there is obtained $Ta=(-c1)/(-c2)=c1/c2$, since $T=-v/\alpha$.

3. Side Stand Control

When the ECU 90 detects that a side stand of the vehicle has changed from a standby position to a working position, the ECU 90 enters in the vehicle height lowering control mode and enables the vehicle height lowering operation through opening of the switching valve 80. Control can be carried out with monitoring the vehicle speed such that lowering control is performed only if the vehicle speed is 0, and lowering control is not performed even if the stand position is the working position, in a case where the vehicle speed is equal to or higher than a very low speed (for instance, 5 km/h).

(B) Vehicle Height Raising Control Mode

During the vehicle height lowering control mode in which the switching valve 80 is held open, as a result of (A) above, the ECU 90 shifts, depending on any of the control conditions 1 to 4 below, to a vehicle height raising control mode in which the switching valve 80 is closed.

The ECU 90 turns off an applied voltage E0 to the switching valve 80 (E0=0 V) when the ECU 90 enters the vehicle height raising control mode and closes the switching valve 80 from an open-valve state.

1. Vehicle Speed Control

When the vehicle speed V of the vehicle exceeds a vehicle height lowering vehicle speed Vd (optionally a vehicle height raising vehicle speed Vu established independently from the vehicle height lowering vehicle speed Vd), i.e. when (V>Vd or V>Vu), the ECU 90 discontinues the vehicle height lowering control mode, enters the vehicle height raising control mode, and enables the vehicle height raising operation through closing of the switching valve 80.

The vehicle height lowering vehicle speed Vd (or vehicle height raising vehicle speed Vu) is established beforehand by the ECU 90. For instance, Vd or Vu may be 40 km/h.

2. Vehicle Stopping Predicted Time Control

The ECU 90 predicts the vehicle stopping predicted time T, discontinues the vehicle height lowering control mode when the predicted vehicle stopping predicted time T exceeds a predefined secondary reference vehicle stopping time Tb (T>Tb), enters the vehicle height raising control mode, and enables the vehicle height raising operation through closing of the switching valve 80.

The ECU 90 predicts the vehicle stopping predicted time T on the basis of the deceleration (or acceleration) of the vehicle. Herein, a secondary reference vehicle speed Vb at which prediction of the vehicle stopping predicted time T is to begin is established beforehand by the ECU 90, such that the ECU 90 predicts the vehicle stopping predicted time T when the vehicle speed V of the vehicle exceeds the secondary reference vehicle speed Vb (V>Vb).

In vehicle stopping predicted time control, the ECU 90 may discontinue the vehicle height lowering control mode, and may enter the vehicle height raising control mode and enable the vehicle height raising operation through closing of the switching valve 80, when an acceleration β of the vehicle exceeds a predefined reference acceleration βb (β>βb), instead of the abovementioned control conditions according to which T>Tb and V>Vb.

The secondary reference vehicle speed Vb, the secondary reference vehicle stopping time Tb and the reference acceleration βb are established beforehand by the ECU 90. Herein, Vb is for instance set to 40 km/h, Tb is for instance set to 3 sec and βb is for instance set to 5 km/h/sec.

3. Prolonged-Time Vehicle Stopping Control

When the vehicle stopping time is equal to or greater than a predefined continued vehicle stopping time Tc, the ECU 90 discontinues the vehicle height lowering control mode, enters the vehicle height raising control mode, and enables the vehicle height raising operation through closing of the switching valve 80.

The continued vehicle stopping time Tc is established beforehand by the ECU 90. For instance, Tc is set to 30 sec.

4. Neutral Control

When the vehicle speed is V=0 and a shift position is in neutral, the ECU 90 discontinues the vehicle height lowering control mode, enters the vehicle height raising control mode, and enables the vehicle height raising operation through closing of the switching valve 80.

Figure 5:
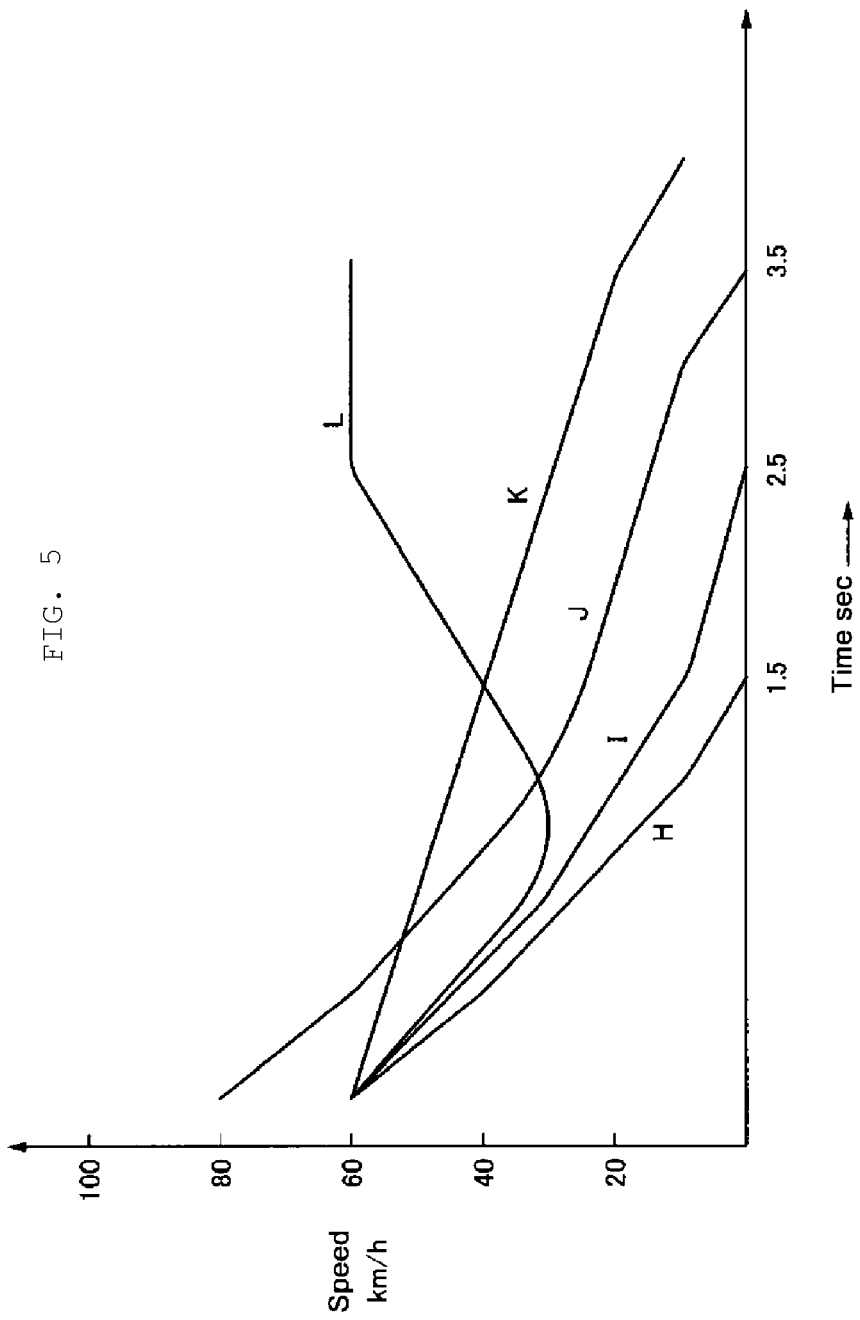
FIG. 5 is a speed line diagram illustrating various travel states of a vehicle.

FIG. 5 illustrates travel states H to L of the vehicle.

Herein, H is a relatively steep braking state, where vehicle stopping time is short, and I is a state of normal braking. In the travel states H and I, the stopping predicted time T is not more than the 2.5 sec of the reference vehicle stopping time Ta, the vehicle height lowering control mode is brought about, and the vehicle height lowering operation is enabled.

Further, J is a state of stepwise deceleration from high-speed travel, and K is a slow travel state, for instance during congested traffic. In the travel states J and K, the vehicle stopping predicted time T exceeds the 2.5 sec of the reference vehicle stopping time Ta, and hence the control mode does not enter the vehicle height lowering control mode, and the vehicle height lowering operation is not performed.

Further, L is a state of re-acceleration halfway during the I braking state. In the L travel state, the control mode enters the vehicle height lowering control mode, and the vehicle height lowering operation is temporarily performed, but control mode shifts to the vehicle height raising control mode, as a result of acceleration from deceleration, before the vehicle height is thoroughly lowered, whereby the vehicle height lowering operation is halted and the vehicle height raising operation is performed.

The present embodiment elicits the effects below.

(a) The vehicle stopping predicted time T is predicted, and when the predicted vehicle stopping predicted time T is not more than the predefined reference vehicle stopping time Ta, the control mode enters the vehicle height lowering control mode, and the vehicle height lowering operation is enabled through opening of the switching valve 80. The vehicle height is lowered from that during travel when the vehicle is close to coming to a stop, and the vehicle height can be thoroughly lowered within a short time until stop of the vehicle; footing can thus be improved and stability secured.

(b) While in the vehicle height lowering control mode of (a) described above, the control mode enters the vehicle height raising control mode when the predicted vehicle stopping predicted time T exceeds the predefined secondary reference vehicle stopping time Tb, and the vehicle height raising operation is enabled through closing, by switching, of the switching valve 80. The vehicle height lowering operation can be discontinued, and shift smoothly to the vehicle height raising operation, without thorough lowering of the vehicle height, when, during deceleration so as to bring the vehicle to a stop, on account of a traffic signal or the like, the signal changes and the vehicle re-accelerates.

(c) The vehicle stopping predicted time T of the vehicle is predicted on the basis of the deceleration a of the vehicle.

(d) The reference vehicle speed Va at which prediction of the vehicle stopping predicted time T is to begin is established beforehand, and the stopping predicted time T is predicted when the vehicle speed V of the vehicle is not faster than the reference vehicle speed Va. Prediction of the vehicle stopping predicted time T is not necessary, and is not performed, when the vehicle speed V is faster than the reference vehicle speed Va for which immediate stopping of the vehicle is unlikely. The vehicle stopping predicted time T is predicted, and the vehicle height lowering operation is performed, after the vehicle speed V is no faster than the reference vehicle speed Va at which the vehicle can stop safely.

The reference vehicle stopping time Ta is set to the discharge time of working oil with which the jack chamber 54 of the hydraulic jack 51 is filled. The vehicle height lowering operation is initiated when the vehicle stopping predicted time T is not more than the reference vehicle stopping time Ta; thereafter, the entirety of the working oil in the jack chamber 54 of the hydraulic jack 51 becomes discharged when the vehicle height lowering operation continues for the reference vehicle stopping time Ta, in other words, it is ensured that the vehicle height is lowered thoroughly to the lowest height.

(e) The vehicle height lowering vehicle speed Vd for which the vehicle height is to be lowered is established irrespective of the vehicle stopping predicted time T, such that when the vehicle speed V of the vehicle is not faster than the vehicle height lowering vehicle speed Vd, the vehicle height lowering control mode is brought about, and the vehicle height lowering operation is enabled through opening, by switching, of the switching valve 80. When the vehicle speed V of the vehicle exceeds the vehicle height lowering vehicle speed Vd while in the vehicle height lowering control mode, the vehicle height raising control mode is brought about, and the vehicle height raising operation is enabled through closing, by switching, of the switching valve 80. When the vehicle speed V is a speed lower than the vehicle height lowering vehicle speed Vd for which the vehicle can stop at any time, the vehicle height is lowered in preparation for that stopping.

(f) Upon detection that the side stand of the vehicle has changed from the standby position to the working position, the vehicle height lowering control mode is brought about and the vehicle height lowering operation is enabled through opening, by switching, of the switching valve 80. When the side stand is changed to the working position, the vehicle is necessarily in a stopped state, and the vehicle height is lowered.

(g) The switching valve 80 comprises the solenoid valve, such that the applied voltage in the open-valve holding stage (energized state holding stage) after a certain period of time since opening of the solenoid valve through energization, is lowered with respect to the initial applied voltage at which the solenoid valve is opened from the closed-valve state, corresponding to the non-energized state, through bringing to the energized state. At the open-valve holding stage (energized state holding stage) of the switching valve 80 that comprises the solenoid valve, battery consumption is reduced through lowering of the voltage applied to the solenoid valve. This constitutes an energy-saving mode.

An embodiment of the present invention has been explained in detail above with reference to accompanying drawings, but the specific features of the present invention are not limited to the embodiment, and various conceivable design variations that do not depart from the gist of the present invention are all encompassed by the latter.

The present invention is a vehicle height adjustment device in a vehicle, comprising a damper tube provided on either a vehicle body side or an axle side; a piston rod, provided on the other of either the vehicle body side or the axle side, and that extends and retracts with respect to the damper tube by sliding in an oil chamber within the damper tube; a hydraulic jack that is provided on one side of either the damper tube or the piston rod; a spring receiver that is supported on a plunger that is inserted in a jack chamber of the hydraulic jack; a suspension spring that is interposed between the spring receiver and a spring receiver that is provided on the other of either the damper tube or the piston rod; a hydraulic pump that supplies a working oil to the jack chamber of the hydraulic jack through a pumping operation resulting from extension and retraction of the piston rod with respect to the damper tube; and a switching valve for intake and discharge of the working oil, so as to switch the working oil to the jack chamber of the hydraulic jack; such that a vehicle height is adjusted through extension and retraction of the piston rod with respect to the damper tube; wherein the vehicle height adjustment device has means for predicting a vehicle stopping predicted time, and when the predicted vehicle stopping predicted time is not more than a predefined reference vehicle stopping time, implementing a vehicle height lowering control mode, and enabling a vehicle height lowering operation through switching of the switching valve. As a result, the vehicle height adjustment device affords better footing by ensuring that vehicle height is lowered upon vehicle stop.

EXPLANATION OF REFERENCE NUMERALS

10 hydraulic shock absorber
11 damper tube
12 piston rod
13 suspension spring
18,19 spring receiver
51 hydraulic jack
54 jack chamber
55 plunger
60 hydraulic pump
80 switching valve
90 ECU (control means)
100 vehicle height adjustment device

What is claimed is:

1. A vehicle height adjustment device in a vehicle, comprising:
    a damper tube provided on one of a vehicle body side and an axle side;
    a piston rod that is provided on the other one of the vehicle body side and the axle side and that extends and retracts with respect to the damper tube by sliding in an oil chamber within the damper tube;
    a hydraulic jack that is provided on one side of the damper tube and the piston rod;
    a spring receiver that is supported on a plunger that is inserted in a jack chamber of the hydraulic jack;
    a suspension spring that is interposed between said spring receiver and a spring receiver that is provided on the other side of the damper tube and the piston rod;
    a hydraulic pump that supplies a working oil to the jack chamber of the hydraulic jack through a pumping operation resulting from extension and retraction of the piston rod with respect to the damper tube; and
    a switching valve for intake and discharge of the working oil, so as to implement switching for the working oil to the jack chamber of the hydraulic jack,
    such that a vehicle height is adjusted due to extension and retraction of the piston rod with respect to the damper tube,
wherein
    the vehicle height adjustment device has means for predicting a vehicle stopping predicted time, and when the predicted vehicle stopping predicted time is not more than a predefined reference vehicle stopping time, implementing a vehicle height lowering control mode, and enabling a vehicle height lowering operation through switching of the switching valve.

2. The vehicle height adjustment device in a vehicle according to claim 1, comprising: means for, when the predicted vehicle stopping predicted time exceeds a predefined secondary reference vehicle stopping time in said vehicle height lowering control mode, implementing a vehicle height raising control mode, and enabling a vehicle height raising operation through operation of the switching valve.

3. The vehicle height adjustment device in a vehicle according to claim 1, wherein the vehicle stopping predicted time is predicted on the basis of deceleration of the vehicle.

4. The vehicle height adjustment device in a vehicle according to claim 1, wherein a reference vehicle speed is established at which prediction of the vehicle stopping predicted time is to begin, and the vehicle stopping predicted time is predicted when the vehicle speed is not faster than the reference vehicle speed.

5. The vehicle height adjustment device in a vehicle according to claim 1, comprising
means for establishing a vehicle height lowering vehicle speed at which the vehicle height is to be lowered, irrespective of the vehicle stopping predicted time, and when the vehicle speed is not faster than the vehicle height lowering vehicle speed, implementing the vehicle height lowering control mode and enabling the vehicle height lowering operation through switching of the switching valve; and
when the vehicle speed exceeds the vehicle height lowering vehicle speed in said vehicle height lowering control mode, implementing the vehicle height raising control mode and enabling the vehicle height raising operation through switching of the switching valve.

6. The vehicle height adjustment device in a vehicle according to claim 1, comprising
means for, upon detection that a side stand of the vehicle has changed from a standby position to a working position, implementing the vehicle height lowering control mode and enabling the vehicle height lowering operation through switching of the switching valve.

7. The vehicle height adjustment device in a vehicle according to claim 1, wherein
said switching valve comprises a solenoid valve, and
the vehicle height adjustment device further has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state.

8. The vehicle height adjustment device in a vehicle according to claim 2, wherein the vehicle stopping predicted time is predicted on the basis of deceleration of the vehicle.

9. The vehicle height adjustment device in a vehicle according to claim 2, wherein a reference vehicle speed is established at which prediction of the vehicle stopping predicted time is to begin, and the vehicle stopping predicted time is predicted when the vehicle speed is not faster than the reference vehicle speed.

10. The vehicle height adjustment device in a vehicle according to claim 2, comprising
means for establishing a vehicle height lowering vehicle speed at which the vehicle height is to be lowered, irrespective of the vehicle stopping predicted time, and when the vehicle speed is not faster than the vehicle height lowering vehicle speed, implementing the vehicle height lowering control mode and enabling the vehicle height lowering operation through switching of the switching valve; and
when the vehicle speed exceeds the vehicle height lowering vehicle speed in said vehicle height lowering control mode, implementing the vehicle height raising control mode and enabling the vehicle height raising operation through switching of the switching valve.

11. The vehicle height adjustment device in a vehicle according to claim 2, comprising
means for, upon detection that a side stand of the vehicle has changed from a standby position to a working position, implementing the vehicle height lowering control mode and enabling the vehicle height lowering operation through switching of the switching valve.

12. The vehicle height adjustment device in a vehicle according to claim 2, wherein
said switching valve comprises a solenoid valve, and
the vehicle height adjustment device further has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state.

13. The vehicle height adjustment device in a vehicle according to claim 3, wherein a reference vehicle speed is established at which prediction of the vehicle stopping predicted time is to begin, and the vehicle stopping predicted time is predicted when the vehicle speed is not faster than the reference vehicle speed.

14. The vehicle height adjustment device in a vehicle according to claim 3, comprising
means for establishing a vehicle height lowering vehicle speed at which the vehicle height is to be lowered, irrespective of the vehicle stopping predicted time, and when the vehicle speed is not faster than the vehicle height lowering vehicle speed, implementing the vehicle height lowering control mode and enabling the vehicle height lowering operation through switching of the switching valve; and
when the vehicle speed exceeds the vehicle height lowering vehicle speed in said vehicle height lowering control mode, implementing the vehicle height raising control mode and enabling the vehicle height raising operation through switching of the switching valve.

15. The vehicle height adjustment device in a vehicle according to claim 3, comprising
means for, upon detection that a side stand of the vehicle has changed from a standby position to a working position, implementing the vehicle height lowering control mode and enabling the vehicle height lowering operation through switching of the switching valve.

16. The vehicle height adjustment device in a vehicle according to claim 3, wherein
said switching valve comprises a solenoid valve, and
the vehicle height adjustment device further has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state.

17. The vehicle height adjustment device in a vehicle according to claim 4, comprising
means for establishing a vehicle height lowering vehicle speed at which the vehicle height is to be lowered, irrespective of the vehicle stopping predicted time, and when the vehicle speed is not faster than the vehicle height lowering vehicle speed, implementing the vehicle height lowering control mode and enabling the vehicle height lowering operation through switching of the switching valve; and when the vehicle speed exceeds the vehicle height lowering vehicle speed in said vehicle height lowering control mode, implementing the vehicle height raising control mode and enabling the vehicle height raising operation through switching of the switching valve.

18. The vehicle height adjustment device in a vehicle according to claim 4, comprising means for, upon detection that a side stand of the vehicle has changed from a standby position to a working position, implementing the vehicle height lowering control mode and enabling the vehicle height lowering operation through switching of the switching valve.

19. The vehicle height adjustment device in a vehicle according to claim 4, wherein said switching valve comprises a solenoid valve, and the vehicle height adjustment device further has means for making a voltage that is applied to the solenoid valve at an energized state holding stage after a certain period of time has elapsed since energization of the solenoid valve, to be lower than an initial applied voltage at which the solenoid valve is brought from a non-energized state to an energized state.

20. The vehicle height adjustment device in a vehicle according to claim 5, comprising means for, upon detection that a side stand of the vehicle has changed from a standby position to a working position, implementing the vehicle height lowering control mode and enabling the vehicle height lowering operation through switching of the switching valve.

\* \* \* \* \*